United States Patent
Harada et al.

(10) Patent No.: US 7,320,251 B2
(45) Date of Patent: Jan. 22, 2008

(54) LOAD DETECTOR AND TRANSPORT EQUIPMENT INCLUDING THE SAME

(75) Inventors: Yoshinori Harada, Shizuoka (JP); Yutaka Mizuno, Shizuoka (JP); Tomoyoshi Koyanagi, Shizuoka (JP); Yoshiyuki Kaneko, Shizuoka (JP)

(73) Assignees: Yamaha Hatsudoki Kabushiki Kaisha, Shizuoka (JP); Yamaha Marine Kabushiki Kaisha, Shizuoka (JP)

( * ) Notice: Subject to any disclaimer, the term of this patent is extended or adjusted under 35 U.S.C. 154(b) by 201 days.

(21) Appl. No.: 11/143,282

(22) Filed: Jun. 2, 2005

(65) Prior Publication Data

US 2005/0275400 A1    Dec. 15, 2005

(30) Foreign Application Priority Data

Jun. 7, 2004    (JP) .............................. 2004-169257

(51) Int. Cl.
*G01B 7/16*    (2006.01)
*G01L 1/00*    (2006.01)

(52) U.S. Cl. ...................................... 73/779
(58) Field of Classification Search ................... 73/779
See application file for complete search history.

(56) References Cited

U.S. PATENT DOCUMENTS

| | | | | |
|---|---|---|---|---|
| 3,440,871 A | * | 4/1969 | Henri ....................... | 73/862.69 |
| 5,817,952 A | * | 10/1998 | Swisher et al. ........ | 73/862.335 |
| 6,237,428 B1 | * | 5/2001 | Odachi et al. ......... | 73/862.333 |
| 6,345,544 B1 | | 2/2002 | Mizuno et al. | |
| 6,765,323 B2 | * | 7/2004 | Takano et al. ............ | 310/68 B |
| 2004/0147179 A1 | | 7/2004 | Mizuno et al. | |

FOREIGN PATENT DOCUMENTS

| | | |
|---|---|---|
| EP | 0964232 A1 | 12/1999 |
| JP | 11-241955 | 9/1999 |
| JP | 11-248559 | 9/1999 |
| JP | 11-304604 A | 11/1999 |
| JP | 2001-264186 A | 9/2001 |

(Continued)

OTHER PUBLICATIONS

Official communication issued in the counterpart European Application No. 05011961.9, mailed on Jun. 19, 2007.

(Continued)

*Primary Examiner*—Octavia Davis
(74) *Attorney, Agent, or Firm*—Keating & Bennett, LLP

(57) ABSTRACT

A load detector is constructed so as to stabilize an output voltage responding to an input load. The load detector includes a magnetostrictive sensor which includes a hollow case, a coil housed in the case, and a rod-like magnetic member located at an axial center of the coil, magnetized by an electric current flowing through the coil and receiving a load at an end thereof. The load detector further includes a pin which has a contact surface for applying the load onto the end of the magnetic member and is disposed axially inline with the magnetic member, and a bearing collar for reducing displacement of the pin with respect to the magnetic member. The magnetostrictive sensor and the pin are fitted, facing each other, into the bearing collar. The load detector is utilized suitably for transport equipment such as a water vehicle or electric bicycle.

17 Claims, 20 Drawing Sheets

FOREIGN PATENT DOCUMENTS

| | | | |
|---|---|---|---|
| JP | 2001-264187 | A | 9/2001 |
| JP | 2001-281074 | | 10/2001 |
| JP | 2003-028735 | A | 1/2003 |
| JP | 2003-057128 | * | 2/2003 |
| JP | 2004-155407 | | 6/2004 |

OTHER PUBLICATIONS

Official communication issued in the counterpart European Application No. 05011961.9, mailed on Oct. 24, 2007.

* cited by examiner

F I G. 1 0

Voltage Value Reproducibility in Response to Load

|  | Unbiased Variance | Unbiased Variance Ratio(%) | Number of Date |
|---|---|---|---|
| Load Detector10 | 0.00007 | 99.9 | 10 |
| Load Detector10a | 0.00092 | 99.0 | 10 |
| Load Detector10d | 0.00152 | 98.3 | 10 |
| Load Detector1 | 0.09063 | 0 | 10 |

F I G. 1 8
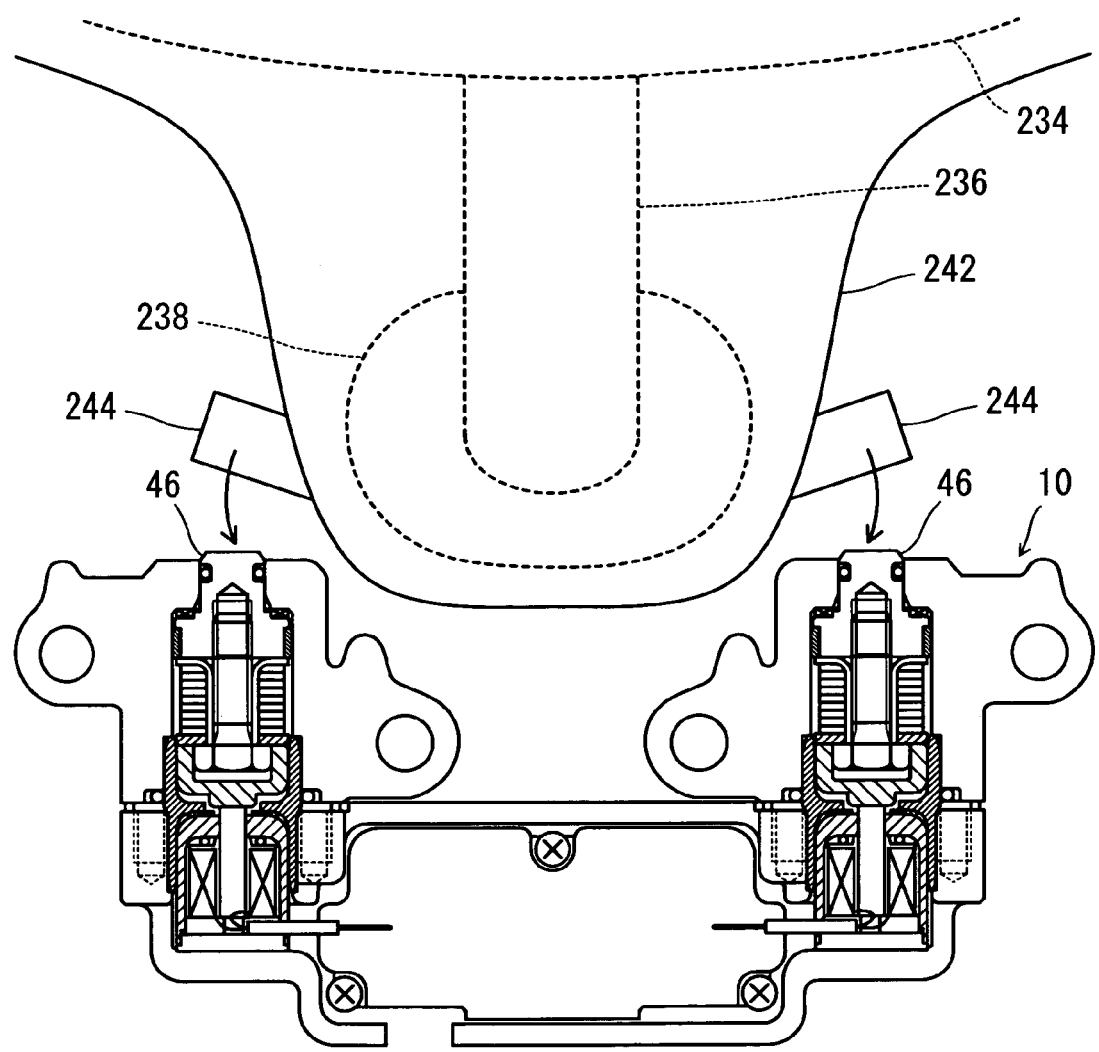

LOAD DETECTOR AND TRANSPORT EQUIPMENT INCLUDING THE SAME

BACKGROUND OF THE INVENTION

1. Field of the Invention

The present invention relates to a load detector and transport equipment including such a load detector. More specifically, the present invention relates to a load detector which electromagnetically detects a load acting directly on a magnetic member, and also relates to transport equipment including such a load detector.

2. Description of the Related Art

Conventional art in this category is disclosed in JP-A 11-241955 and JP-A 2001-281074, which are hereinafter referred to as Patent Documents 1 and 2, respectively.

Patent Document 1 discloses a load detector which includes a detection portion having a coil and a magnetic member defined by a solid rod disposed at an axial center of the coil. The coil magnetizes the magnetic member, a load is applied directly to the magnetic member, and the load is detected from a resulting inductance change.

Patent Document 2 discloses a load detector provided with an overload prevention mechanism which enables a magnetostrictive load sensor to detect a load accurately without being affected by an overload.

However, according to these conventional techniques, it is sometimes impossible to transmit the load axially to the magnetostrictive sensor without axial displacement or tilt. If such axial displacement or tilt occurs, an output voltage which is a response to the input load becomes unstable.

SUMMARY OF THE INVENTION

In order to overcome the problems described above, preferred embodiments of the present invention provide a load detector that is capable of stabilizing the output voltage in response to the input load, and also provide transport equipment including such a novel load detector.

According to a preferred embodiment of the present invention, a load detector includes a magnetostrictive sensor having a hollow case, a coil housed in the case, and a rod-like magnetic member located in an axial center of the coil, magnetized by an electric current flowing through the coil and receiving a load at an end thereof, a pin having a contact surface for applying the load onto the end of the magnetic member and disposed axially inline with the magnetic member, and a displacement reduction member arranged to reduce displacement of the pin with respect to the magnetic member.

According to a preferred embodiment of the present invention, the displacement reduction member minimizes and prevents axial displacement and tilt of the pin with respect to the magnetic member, to thereby stabilize the output voltage in response to the input load.

Preferably, the displacement reduction member includes a tubular member into which the magnetostrictive sensor and the pin are fitted so as to face each other. By fitting the magnetostrictive sensor and the pin face to face into a single tubular member, a positional relationship between the magnetostrictive sensor and the pin is fixed. Therefore, axial displacement and tilt of the pin with respect to the magnetic member is reduced easily, thereby enabling transmission of the load axially to the magnetic member.

Preferably, the tubular member has one or more ribs extending axially in at least one of an inner side surface on the magnetostrictive sensor side and an inner side surface on the pin side. By providing one or more ribs extending axially in an inner side surface of the tubular member, it becomes possible to hold the magnetostrictive sensor and the pin stably in the tubular member without play, and to easily reduce axial displacement and tilt of the pin with respect to the magnetic member. This construction is especially effective when the tubular member is made of resin.

Further preferably, the rib is displaceable in a radially increasing direction when the tubular member is fitted by the magnetostrictive sensor or the pin. In this case, it becomes possible to reduce the wear of the rib even if the rib makes contact with the pin when the tubular member is fitted with the pin. Further, even if the tubular member is fitted with the magnetostrictive sensor and the rib makes contact with the magnetostrictive sensor, the impedance of the magnetostrictive sensor itself is not affected and therefore it is possible to stabilize characteristics of the magnetostrictive sensor.

Preferably, the displacement reduction member includes a collar extending axially of the pin on a side that is spaced away from the contact surface of the pin, and a fixing element arranged to integrate the pin with the collar. In a preferred embodiment of the present invention, the collar is extended axially on a side that is spaced away from the pin's contact surface with the magnetic member, and the pin and the collar are integrated with each other by the fixing element. Thus, the pin, which applies a load onto the magnetic member, is made practically longer in the axial direction, making it possible to provide a fulcrum point of the pin for its axial displacement or to tilt farther away from the contact point between the pin and the magnetic member. Therefore, axial displacement and tilt of the pin with respect to the magnetic member are easily minimized, thereby facilitating transmission of the load axially to the magnetic member.

Preferably, the displacement reduction member includes a tubular extension of the case extended axially on a side of the pin, for being fitted by the pin. By fitting the pin into the extension of the magnetostrictive sensor case, it becomes possible to reduce axial displacement and tilt of the pin with respect to the magnetic member easily without increasing the number of parts, and to transmit the load axially to the magnetic member.

Further preferably, the displacement reduction member preferably includes a conical recess provided in a contact surface of the magnetic member which makes contact with the pin, and a hemispherical projection capable of fitting into the recess and provided in the contact surface of the pin which makes contact with the magnetic member. In this case, it becomes possible to reduce axial displacement and tilt easily by simply fitting the hemispherical projection of the pin into the conical recess of the magnetic member.

Preferably, the displacement reduction member is defined by a flat contact surface of the magnetic member which makes contact with the pin and a spherical contact surface of the pin which makes contact with the magnetic member. In this case, the load is not applied at an angle from an outside edge of the magnetic member, and it is possible to apply the load axially on the flat contact surface of the magnetic member, by bringing the spherical contact surface of the pin into contact with the flat contact surface of the magnetic member.

The load detector may include a plurality of load detection units each including the magnetostrictive sensor, the pin and the displacement reduction member.

The present invention is suitably applied to transport equipment and vehicles, particularly to water vehicles, boats, motorcycles, and bicycles.

The above and other elements, features, characteristics, aspects and advantages of the present invention will become clearer from the following description of preferred embodiments to be made with reference to the attached drawings.

BRIEF DESCRIPTION OF THE DRAWINGS

FIG. 10 is a table showing a result of an experiment.

FIG. 18 is a schematic view showing a surrounds of a load detector applied to the water vehicle in FIG. 16.

DETAILED DESCRIPTION OF THE PREFERRED EMBODIMENTS

Hereinafter, preferred embodiments of the present invention will be described with reference to the drawings.

Figure 1:
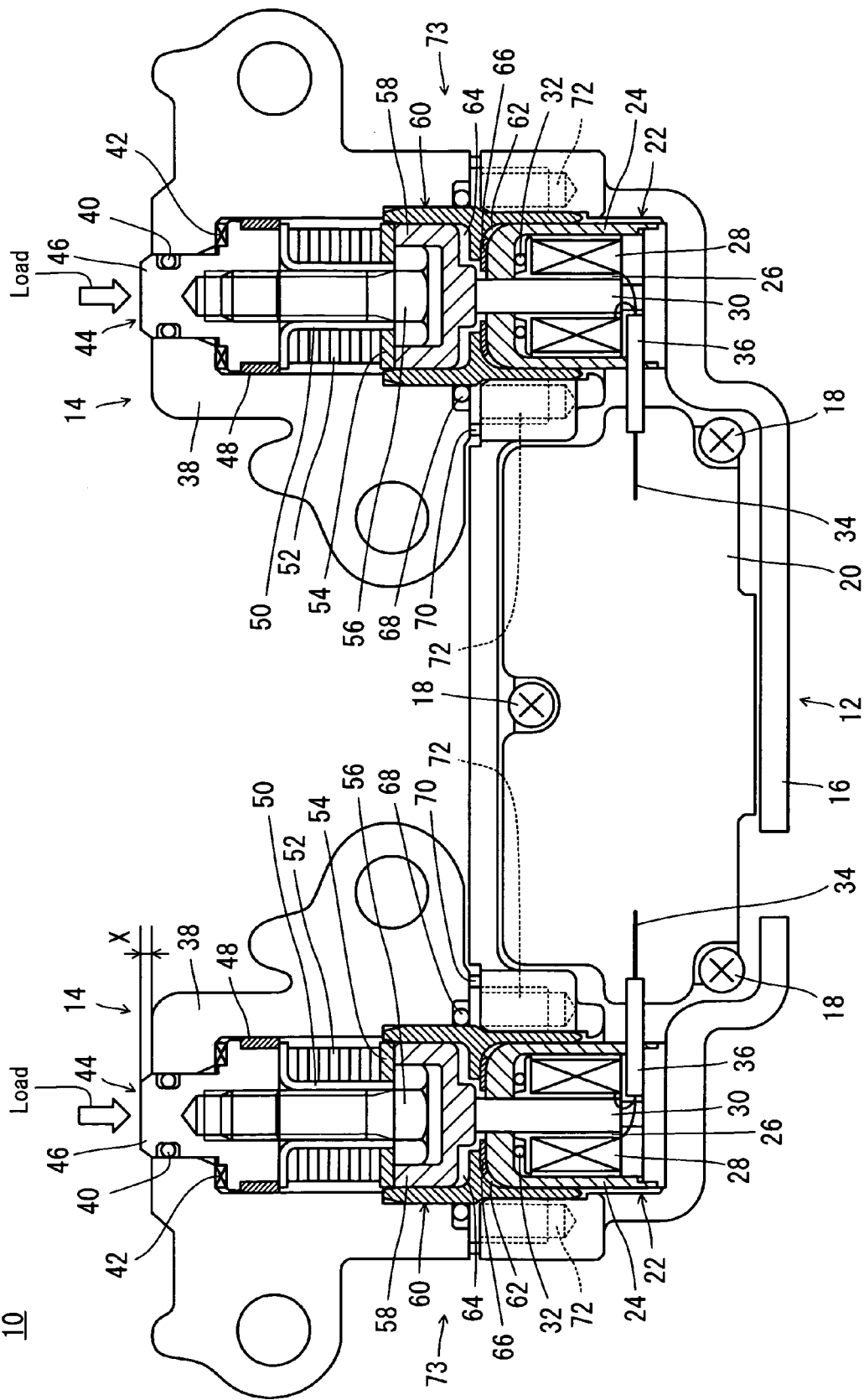
FIG. 1 is a schematic sectional view of a load detector according to a preferred embodiment of the present invention.

Referring to FIG. 1, a load detector 10 which is a preferred embodiment of the present invention includes a housing unit 12 having two ends, and two force limiters 14 each attached to one of the ends of the housing unit 12.

The housing unit 12 includes a housing case 16 which is a box-like structure and does not have a wall surface facing the viewer of the figure. The housing case 16 has a central portion accommodating an electronic circuit substrate 20 which is fixed with a screw 18.

The housing case 16 has two end portions each accommodating a magnetostrictive sensor 22. Each magnetostrictive sensor 22 includes a hollow cylindrical case 24, a bobbin 26 in the case 24, a coil 28 wound around the bobbin 26, a rod-like magnetic member 30 disposed in the axial center of the coil 28, and an O-ring 32 which seals an area between the case 24 and the coil 28. The magnetic member 30, which is magnetized by a current flowing through the coil 28, receives a load on its end. Conductor wires 34 such as enamel wires of the coil 28 in the magnetostrictive sensor 22 are drawn out of the case 24, tied with a shrink tube 36, and then soldered to predetermined terminals on the electronic circuit substrate 20.

At each of the ends in the housing unit 12 as described above, the force limiter 14 is disposed in alignment with the magnetostrictive sensor 22.

The force limiter 14 limits the amount of load transferred to the magnetostrictive sensor 22 if the amount of load applied from outside is not smaller than a predetermined amount, in order to protect the magnetostrictive sensor 22 from damage. The force limiter 14 includes an axially hollow force limiter case 38. The force limiter case 38 accommodates a unit 44 which has an outer circumferential surface fitted with an O-ring 40 and a wave washer 42.

The unit 44 includes a button 46 which receives a load from outside. The button 46 has its end surface exposed from the force limiter case 38. The button 46 has an outer circumferential surface fitted with a bearing 48. The button 46 has another end surface to which a collar 50, a plurality of conical washers 52 and a plane washer 54 are integrally held by a bolt 56. A pin 58 is fitted around a head of the bolt 56 of the unit 44.

In the force limiter 14 as constructed above, when a load is applied to the button 46, the button 46 is pressed and the force is transmitted sequentially in the order of the horizontal portion of the collar 50, the conical washers 52, the plane washer 54 and then the pin 58. When the button 46 comes under a certain level of force (e.g., a few hundreds of Newtons), the bolt 56 comes off the plane washer 54 to absorb impact with the conical washers 52. When a certain level of additional force not smaller than a predetermined level is applied, the button 46 moves down. When the falling distance becomes X where the upper surface of the button 46 becomes flush with an upper surface of the force limiter case 38, the button can no longer move down, and the load is limited. With the above-described construction, magnetostrictive sensor 22 is protected from impact and overloading, and therefore the magnetostrictive sensor 22 is protected from damage.

The load detector 10 further includes a bearing collar 60. The bearing collar 60 is generally hollow and cylindrical, having two receptacles 62 and 64. The magnetostrictive sensor 22 is inserted into the receptacle 62 whereas the pin 58 is inserted into the receptacle 64, so that the magnetostrictive sensor 22 and the pin 58 face each other and the magnetic member 30 and the pin 58 are aligned along the same axis. A seal member 66 is inserted between an inner surface of the receptacle 62 and the magnetostrictive sensor 22. The cylindrical portion of the bearing collar 60 on the side of receptacle 62 is snugly fitted into the housing case 16. The other cylindrical portion of the bearing collar 60 on the side of receptacle 64 is snugly fitted into the force limiter case 38.

With the magnetic member 30, the unit 44 and the pin 58 being aligned along the same axis, the housing unit 12 and the force limiter 14 are bolted via an O-ring 68 and a plate 70 with a plurality of bolts 72. Thus, on each side in the housing unit 12, there is constructed a load detection unit 73 which includes the magnetostrictive sensor 22, the pin 58 and the bearing collar 60.

Figure 2:
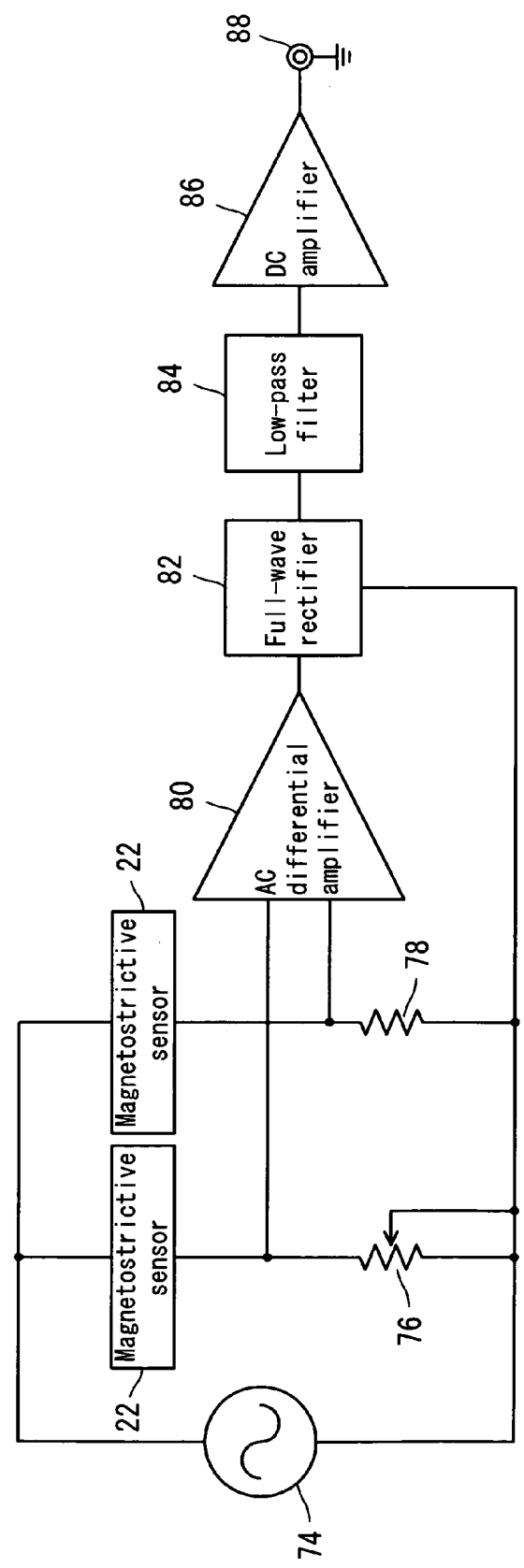
FIG. 2 is a block diagram showing an electrical configuration of the load detector in FIG. 1.

On the electronic circuit substrate 20, there is provided an electrical circuit as shown in FIG. 2. Specifically, an AC transmission circuit 74, such as an AC oscillator, is connected with the two magnetostrictive sensors 22, and a predetermined AC current is applied to each coil 28 of the magnetostrictive sensors 22. One of the magnetostrictive sensors 22 is connected with a variable resistor 76 whereas the other magnetostrictive sensor 22 is connected with a fixed bridge resistor 78. An output voltage differential between the two magnetostrictive sensors 22 is amplified by an AC differential amplifier 80, and then rectified by a full-wave rectifier 82. Further, a low-pass filter 84 extracts a low frequency component, and a signal voltage amplified by a DC amplifier 86 is outputted from a terminal 88. In this way, the terminal 88 outputs a signal voltage which represents a load detected by the load detector 10.

According to the load detector 10, by snugly fitting the magnetostrictive sensor 22 and the pin 58 into a single tubular bearing, collar 60, it becomes possible to stabilize positional relationship between the magnetic member 30 and the pin 58. Therefore, axial displacement and tilt of the pin 58 with respect to the magnetic member 30 are easily prevented and minimized, and it becomes possible to apply the load axially to the magnetic member 30, and thereby to stabilize the output voltage in response to the input load. Further, it becomes possible to improve the yield of the load detector 10.

Figure 3A:
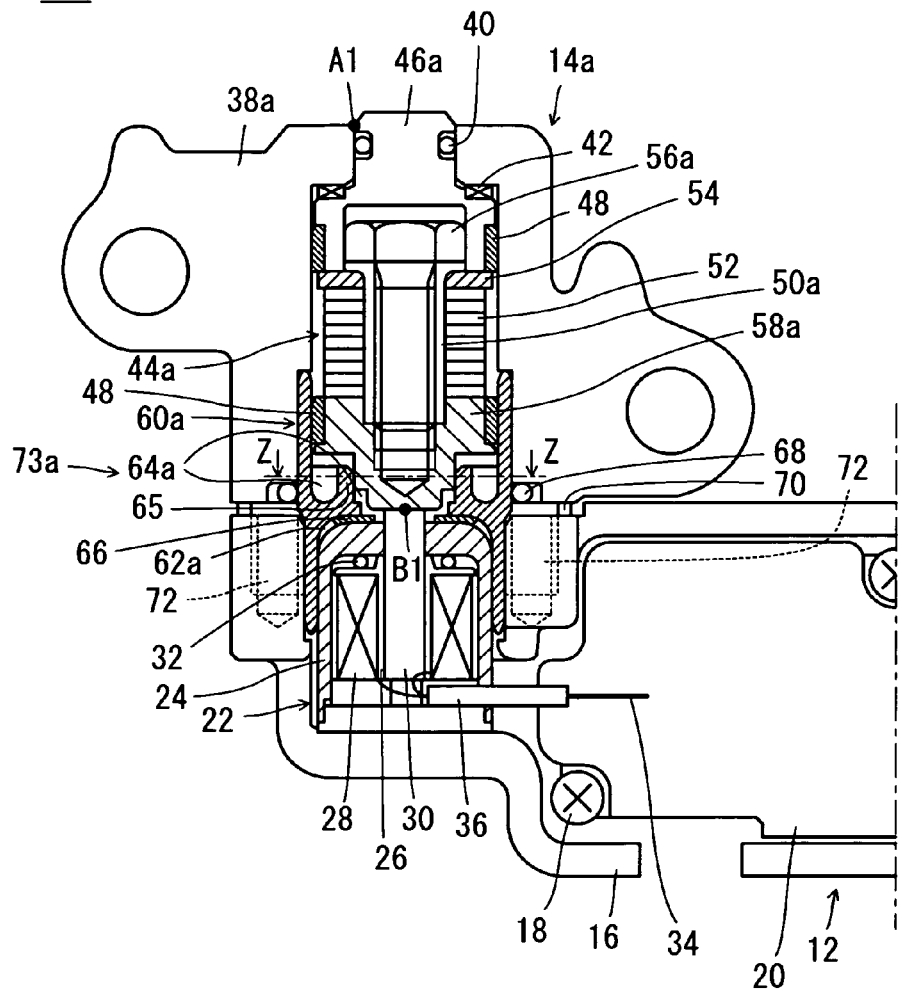
FIG. 3A is a schematic sectional view of another preferred embodiment of the present invention.
Figure 3B:
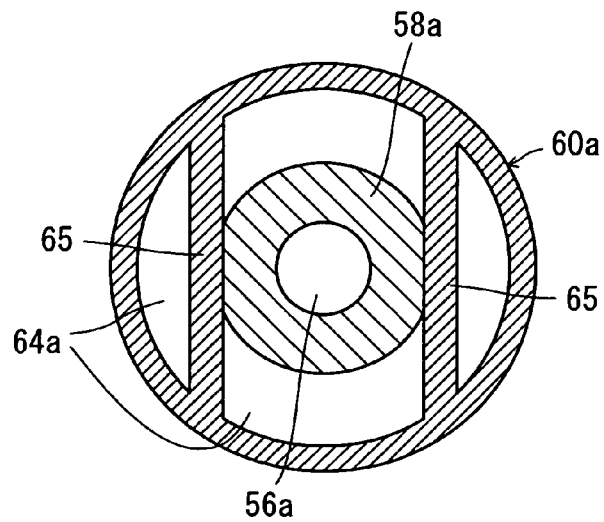
FIG. 3B is a schematic sectional view of a bearing collar, etc. taken along lines Z-Z in FIG. 3A.

Next, reference will be made to FIGS. 3A and 3B, to describe a load detector 10a according to another preferred embodiment of the present invention.

The load detector 10a includes a housing unit 12 having two ends, and two force limiters 14a each attached to one of the ends of the housing unit 12. However, since the two force limiters 14a have the same construction, FIG. 3A shows only one of the two, and the description will be made accordingly. The same will hold for load detectors 10b through 10d which will be described later.

In the force limiter 14a of the load detector 10a, a plane washer 54 and a plurality of conical washers 52 are fitted around a collar 50a. The collar 50a under this condition has its tip portion inserted axially into a pin 58a. In this way, the collar 50a sits with an improved accuracy of axial alignment and verticality with respect to the pin 58a. Further, a fixing element such as a bolt 56a fixes the collar 50a integrally to the pin 58a, to constitute a unit 44a. The pin 58a has an outer circumferential surface fitted with a bearing 48, and a head of the bolt 56a as a part of the unit 44a is fitted into the button 46a.

The bearing collar 60a of the load detector 10a is hollow, generally cylindrical, and has two receptacles 62a and 64a. A pair of ribs 65 are provided inside the receptacle 64a. Each of the ribs 65 is generally strip-like and substantially parallel to each other, serving as a stopper which prevents the pin 58a from rotating. With the arrangement described above, the magnetostrictive sensor 22 is fitted into the receptacle 62a whereas the pin 58a is fitted into the receptacle 64a, so that the magnetostrictive sensor 22 and the pin 58a face each other, and the magnetic member 30 and the pin 58a are aligned along the same axis. According to the present preferred embodiment, part of the outer circumferential surface of the pin 58a is fitted between the pair of ribs 65 such that the pin 58a is prevented from rotating. It should be noted here that parts of the outer circumferential surface of the pin 58a which contact the ribs 65 are made flat. A seal member 66 is inserted between an inner surface of the receptacle 62a and the magnetostrictive sensor 22. The cylindrical portion of the bearing collar 60a on the side of receptacle 62a is snugly fitted into the housing case 16. The other cylindrical portion of the bearing collar 60a on the side of receptacle 64a is snugly fitted into the force limiter case 38a.

Other arrangements are the same as in the load detector 10 shown in FIG. 1, so these components are indicated by the same or similar reference numerals (the same numbers plus a suffix "a") as in the load detector 10, and description will not be repeated.

As described, the collar 50a fitted with the plane washer 54 and the conical washers 52 is fitted into the pin 58a and is fastened with a bolt 56a to make the unit 44a an integrated structure. This means that the member which applies a load to the magnetic member 30 includes the pin 58a, the collar 50a and the bolt 56a, and that the pin can be made practically longer in the axial direction. Then, the head of the bolt 56a of the unit 44a having such a construction is fitted into the button 46a. Thus, the bolt 46a and the force limiter case 38a make contact with each other at a point A1 which serves as a fulcrum point when the pin 58a displaces or tilts off the alignment. In this arrangement, the magnetic member 30 and the pin 58a make contact at a point B1, and it is possible to make a distance from this contact point B1 to the fulcrum point A1 longer than in a comparative example shown in FIG. 9 (the fulcrum point indicated by A2, and the contact point indicated by B2).

According to the load detector 10a, since it is possible to elongate the distance from the contact point B1 to the fulcrum point A1, axial displacement or tilt of the pin 58a with respect to the magnetic member 30 is reduced easily, and it becomes possible to apply the load axially to the magnetic member 30, thereby to stabilize the output voltage with respect to the input load. Further, it becomes possible to improve the yield of the load detector 10.

Figure 4:
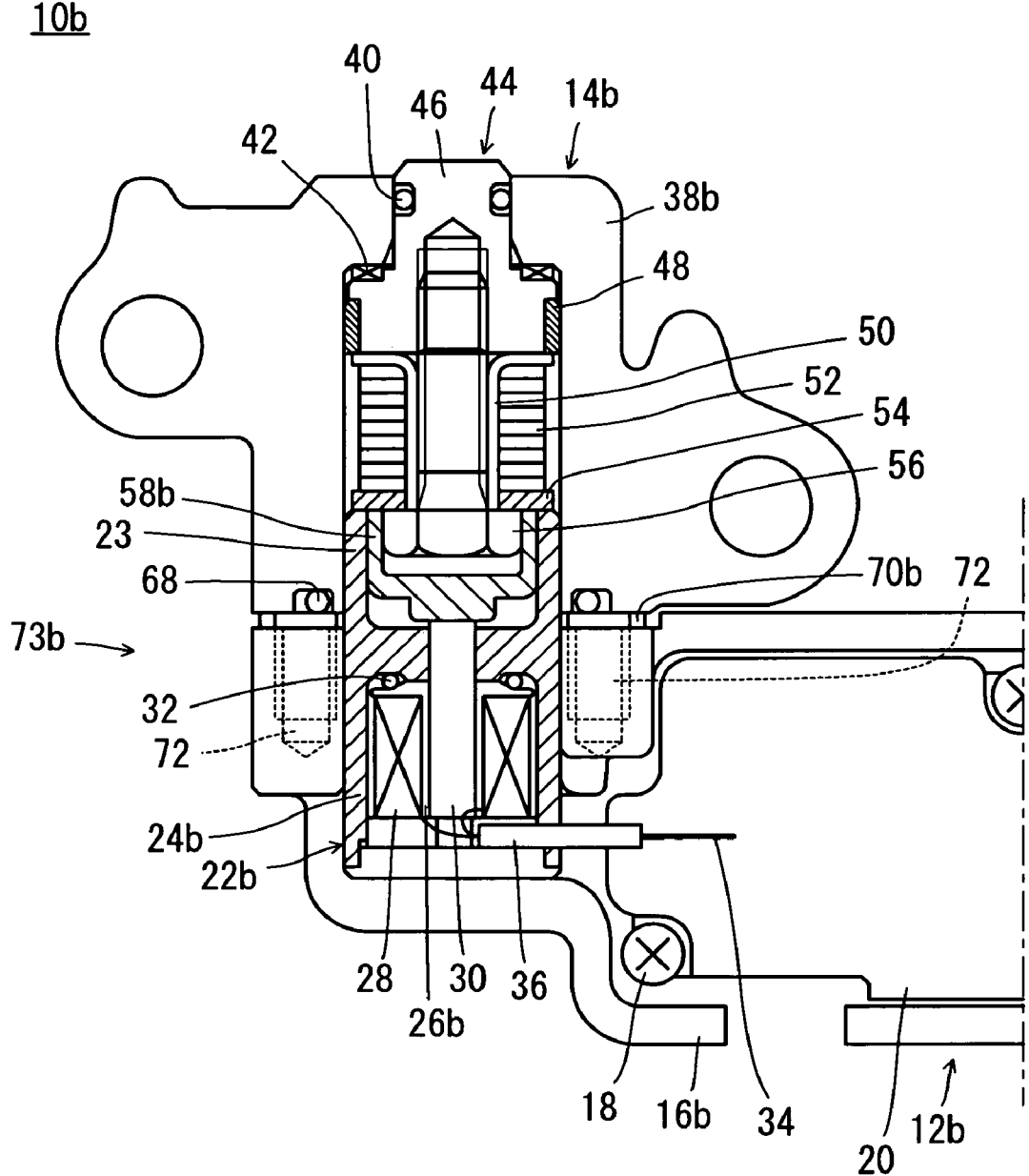
FIG. 4 is a schematic sectional view of another preferred embodiment of the present invention.

Further, reference will be made to FIG. 4, and description will be given for a load detector 10b according to another preferred embodiment of the present invention.

In the load detector 10b, a case 24b of a magnetostrictive sensor 22b is extended axially and cylindrically on the side of a pin 58b, to form an extension 23. The pin 58b is fitted into the extension 23. Other arrangements are preferably the same as in the load detector 10 shown in FIG. 1, so these components are indicated by the same or similar reference numerals (the same numbers plus a suffix "b") as in the load detector 10, and description will not be repeated.

According to the load detector 10b, by snugly fitting the pin 58b into the extension 23 of the case 24b, axial displacement or tilt of the pin 58b with respect to the magnetic member 30 is reduced easily without using a bearing collar, and it becomes possible to apply the load axially to the magnetic member 30, and thereby to stabilize the output voltage to the input load. Further, it becomes possible to improve yield of the load detector 10b.

Figure 5:
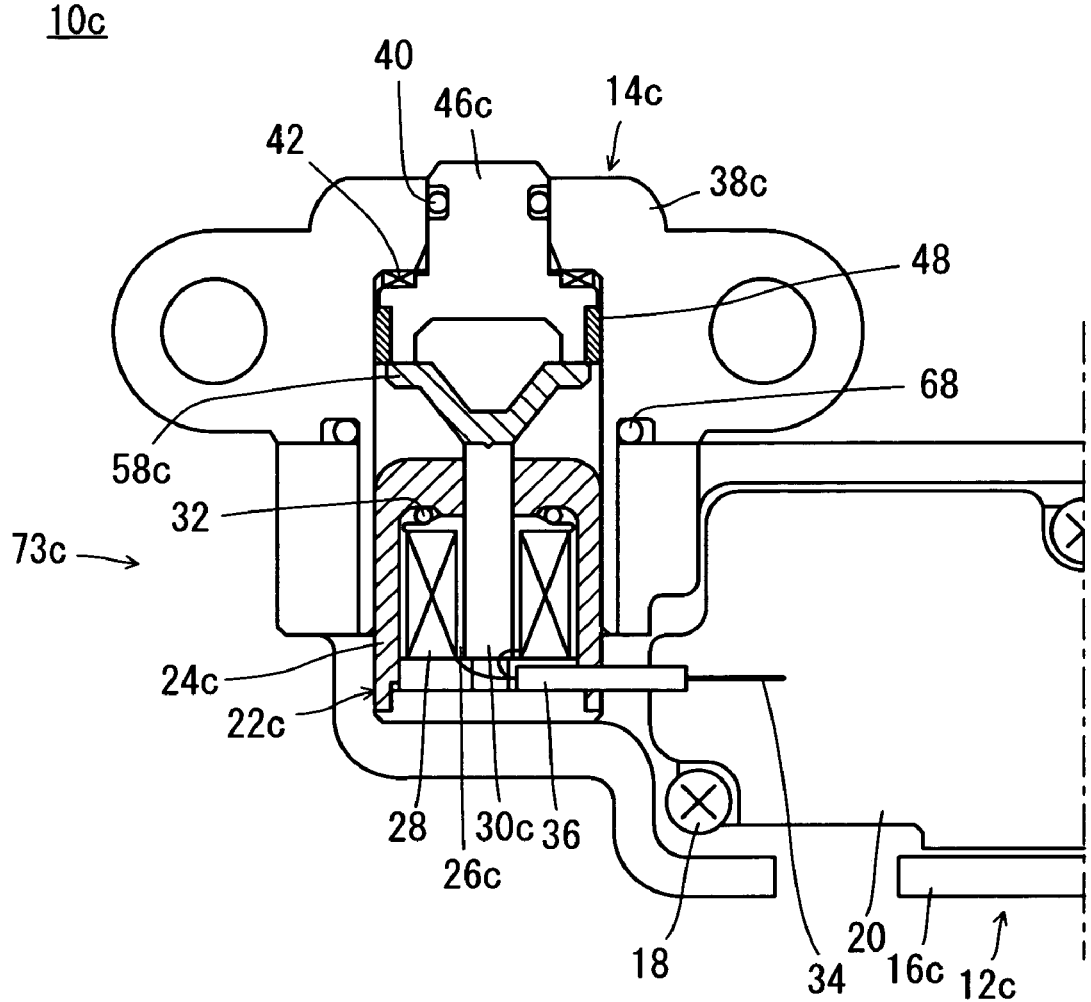
FIG. 5 is a schematic sectional view of still another preferred embodiment of the present invention.

Further, reference will be made to FIG. 5 and FIG. 6 to describe a load detector 10c according to another preferred embodiment of the present invention.

Figure 6:
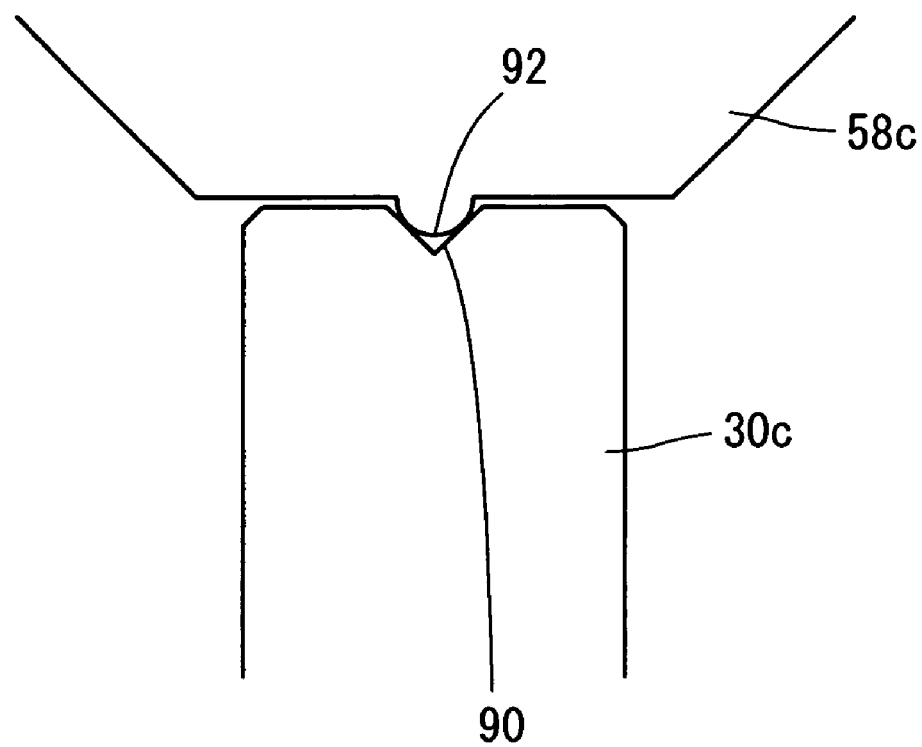
FIG. 6 is a schematic view of a primary portion of the preferred embodiment in FIG. 5.

In the load detector 10c, as shown in FIG. 6, a surface of a magnetic member 30c which makes contact with a pin 58c is formed with a conical recess 90 whereas a surface of the pin 58c which makes contact with the magnetic member 30c is formed with a hemispherical projection 92 which fits into the recess 90. Further, a force limiter case 38c is generally cylindrical, having an axial through hole, and this single force limiter case 38c accommodates a button 46c, the pin 58c and a magnetostrictive sensor 22c. Other arrangements should be easily understood from the load detector 10 shown in FIG. 1, so these components are indicated by the same or similar reference numerals (the same numbers plus a suffix "c") as in the load detector 10, and description will not be repeated.

According to the load detector 10c, axial displacement and tilt of the pin 58c with respect to the magnetic member 30c is reduced easily by simply fitting the hemispherical projection 92 of the pin 58c into the conical recess 90 of the magnetic member 30c. Further, by encasing the force transmission mechanism composed of the button 46c, the pin 58c, the magnetostrictive sensor 22c and so on in a single body of the force limiter case 38c, it becomes possible to minimize displacement and tilt. Therefore, it becomes possible to apply the load axially to the magnetic member 30, and thereby to stabilize the output voltage to the input load. Further, it becomes possible to improve yield of the load detector 10c.

Figure 7:
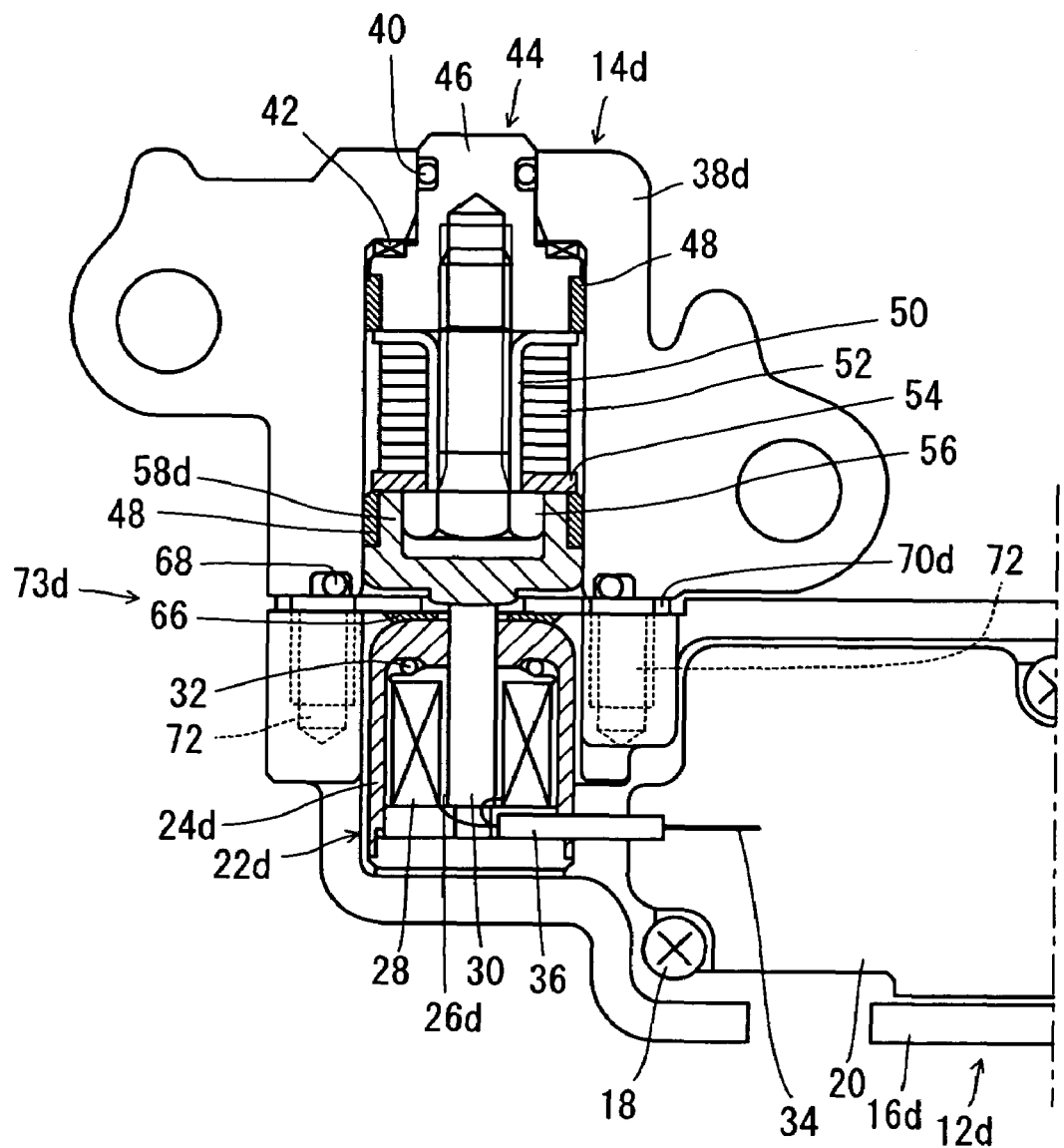
FIG. 7 is a schematic sectional view of another preferred embodiment of the present invention.

Further, reference will be made to FIG. 7 and FIG. 8, to describe a load detector 10d according to another preferred embodiment of the present invention.

Figure 8:
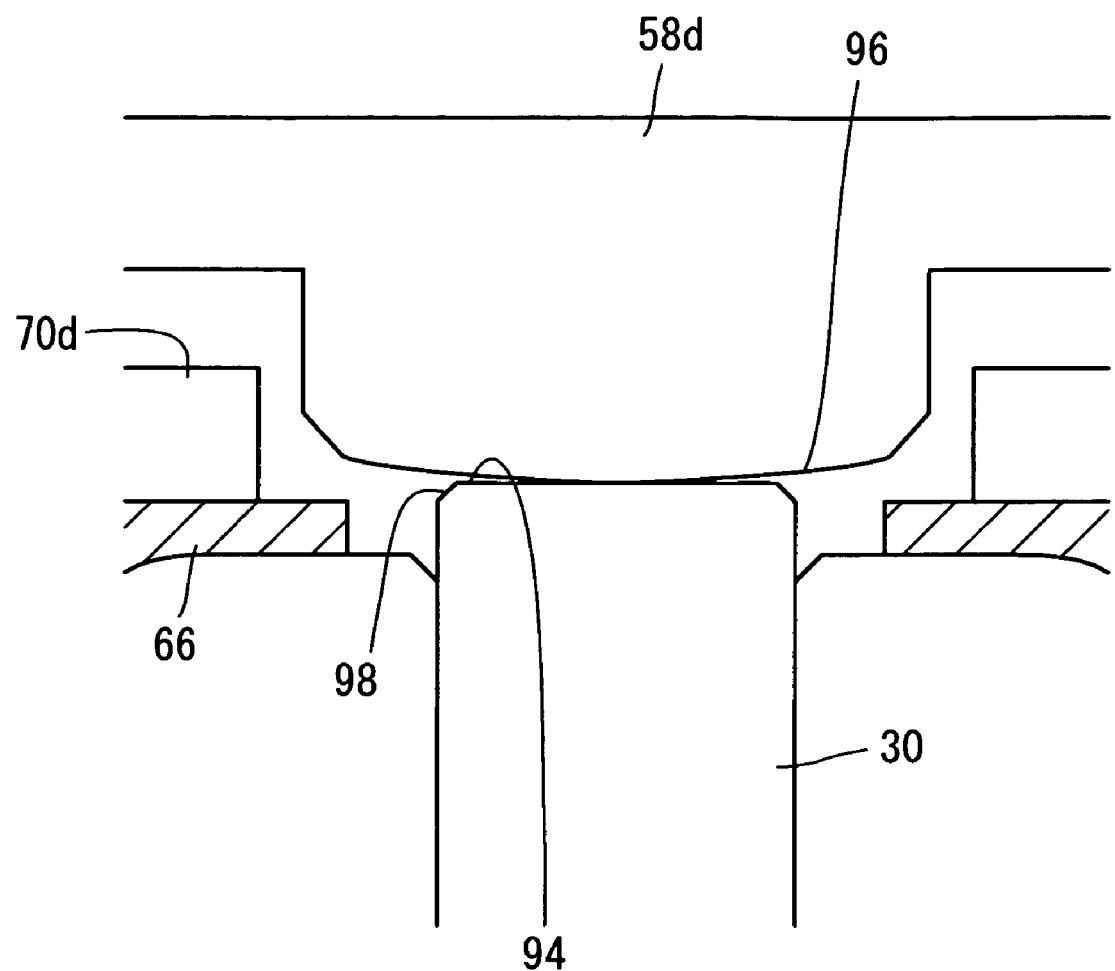
FIG. 8 is a schematic view of a primary portion of the preferred embodiment in FIG. 7.

In the load detector 10d, as shown in FIG. 8, a contact surface 94 of the magnetic member 30 which makes contact with a pin 58d is preferably flat, whereas a contact surface 96 of the pin 58d which makes contact with the magnetic member 30 is preferably spherical. Other arrangements are preferably the same as in the load detector 10 shown in FIG. 1, so these components are indicated by the same or similar reference numerals (the same numbers plus a suffix "d") as in the load detector 10, and description will not be repeated.

According to the load detector 10d, even when the load is applied to the magnetic member 30 from an angled direction, the load does not act on a corner 98 of the magnetic member 30, but on the flat contact surface 94. Therefore, it is possible to minimize axial displacement and tilt, to apply the load axially to the magnetic member 30, and thereby to stabilize the output voltage with respect to the input load. Further, it becomes possible to improve yield of the load detector 10d.

Next, description will cover an experimental example.

Figure 9:
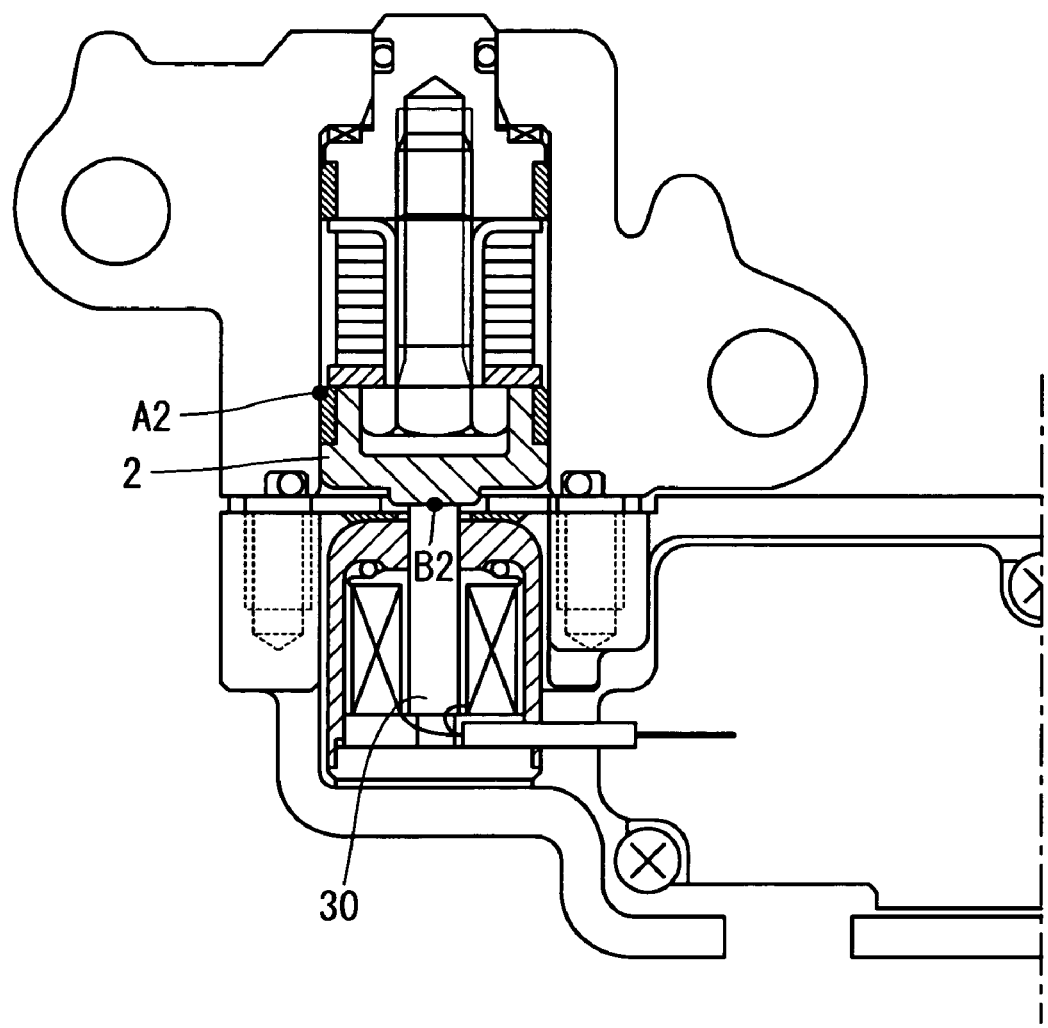
FIG. 9 is a schematic sectional view of a comparative example.

In this experiment example, voltage reproducibility to a load was obtained for each of the load detectors 10, 10a and 10d according to the preferred embodiments described above as well as for a comparative example or the load detector 1 in FIG. 9. Experimental results are shown in FIG. 10.

In the load detector 1 shown in FIG. 9, the cylindrical bearing collar included in the load detector 10 in FIG. 1 is not used. Further, the fulcrum point A2 for displacing or tilting movement of load applying members (including the pin 2) which apply a load to the magnetic member 30 is closer to the contact point B2 of the magnetic member 30 to the pin 2. Both contact surfaces of the magnetic member 30 and of the pin 2 are flat.

In the experiment, a load of 500 N was applied at a room temperature of 25° C., and a voltage value responding to the load was measured with an autograph (a compression/tension/bending tester, Model AG-1 5KN, manufactured by Shimadzu Corporation). This test cycle was repeated ten times, and based on the measured voltage values, unbiased variance and unbiased variance ratio (%) were obtained for each of the load detectors 10, 10a, 10d and 1.

As understood from the experimental results shown in FIG. 10, a smaller unbiased variance and a greater variance ratio were obtained for each of the load detectors 10, 10a and 10d, as compared to the comparative example or the load detector 1, showing that they have good voltage value reproducibility.

Figure 11:
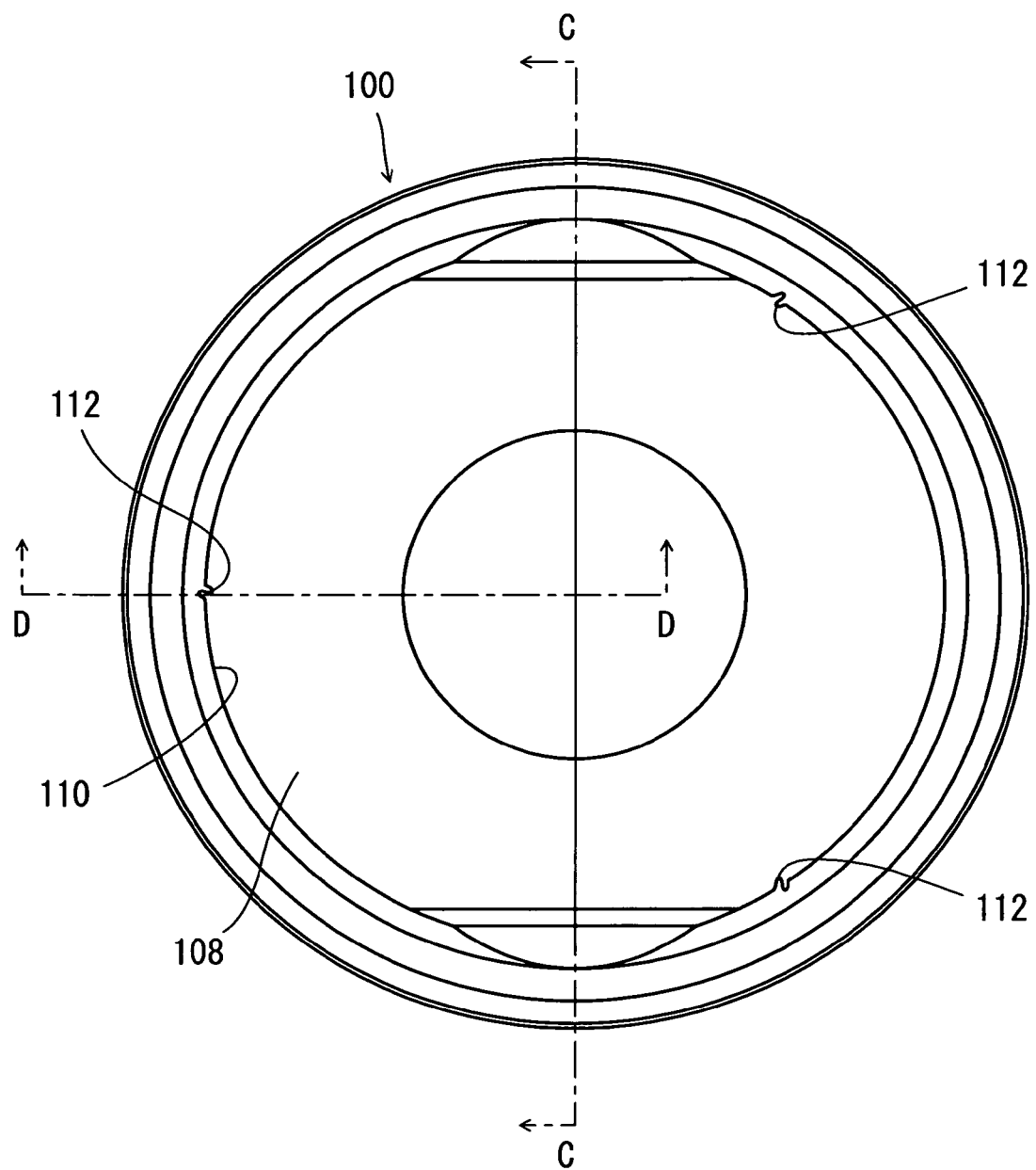
FIG. 11 is a plan view showing a variation of the bearing collar.
Figure 12:
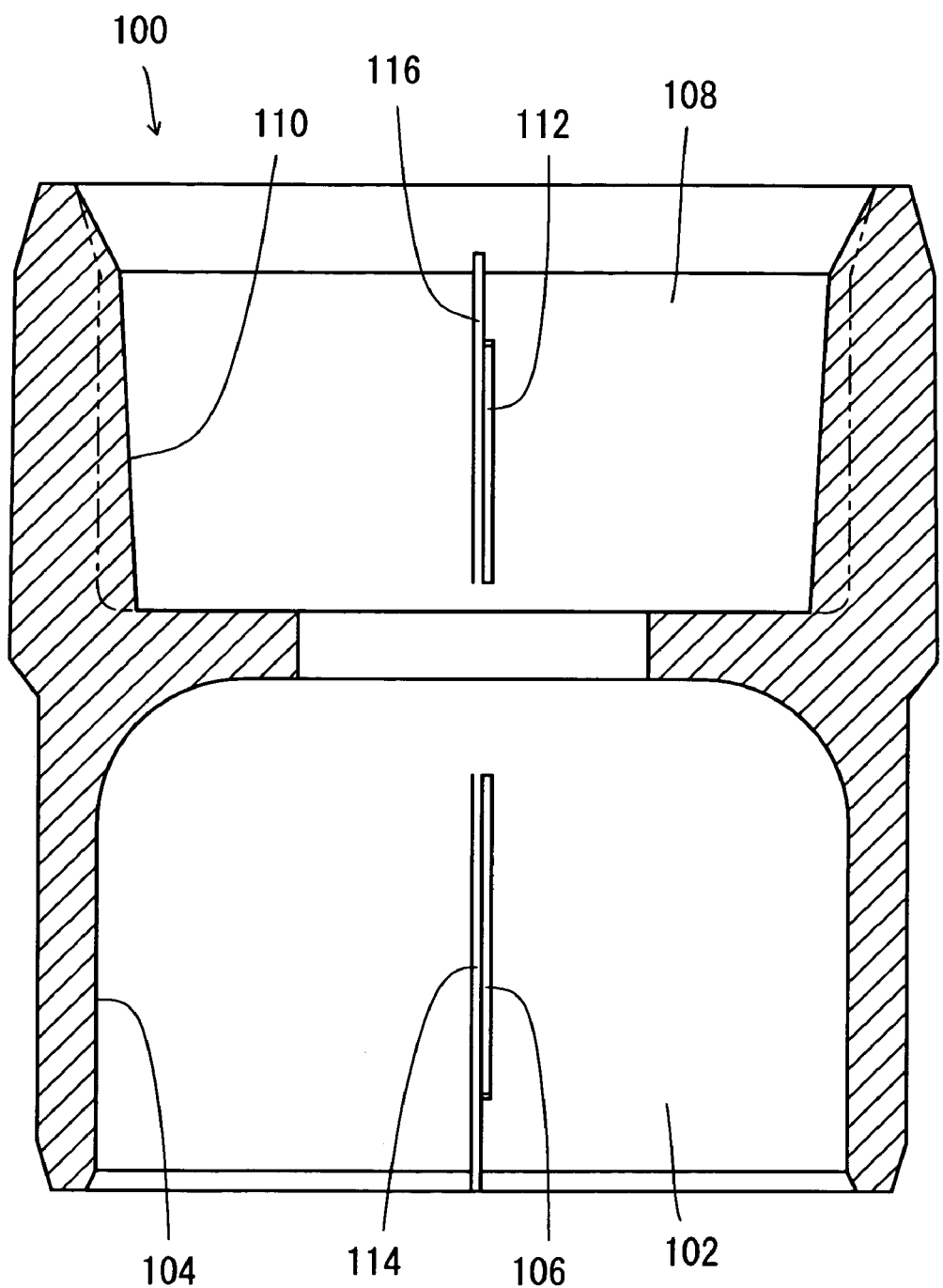
FIG. 12 is a sectional view of the bearing collar taken along lines C-C in FIG. 11.
Figure 13:
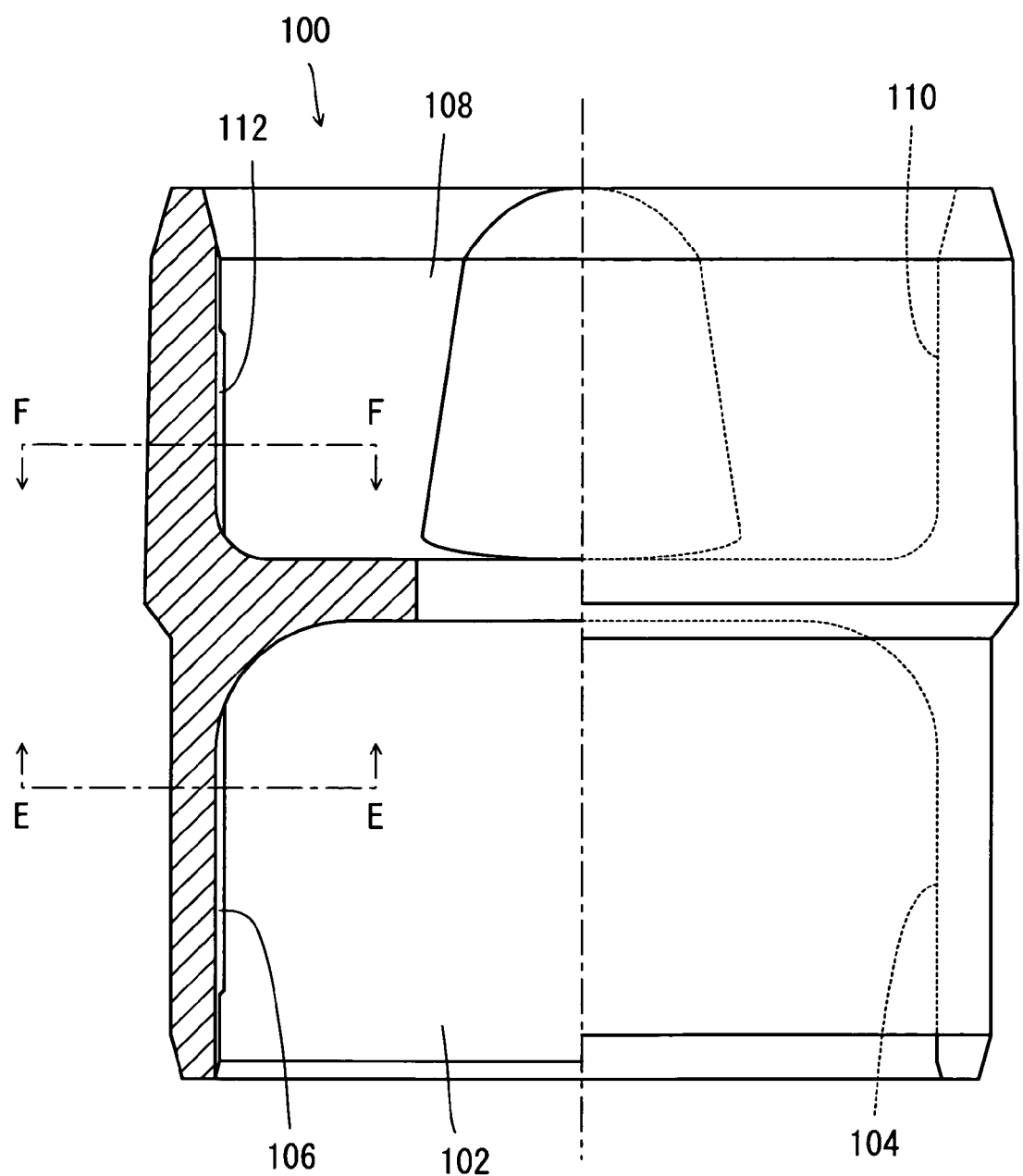
FIG. 13 includes two views: the left half is a sectional view of the bearing collar taken along lines D-D in FIG. 11 whereas the right half is a front view thereof.

The bearing collar 60 which is preferably included in the load detector 10 in FIG. 1 may be replaced by a bearing collar 100 shown in FIG. 11 through FIG. 13.

In the bearing collar 100, there are formed three equidistant (e.g., arranged at approximately 120 degree angular spacing according to the present preferred embodiment) ribs 106 which extend axially in an inner circumferential surface 104 of a receptacle 102 on the side of magnetostrictive sensor 22. Likewise, there are formed three equidistant (e.g., arranged at approximately 120 degree angular spacing according to the present preferred embodiment) ribs 112 which extend axially in an inner side surface 110 of a receptacle 108 on the side of pin 58.

Figure 14:
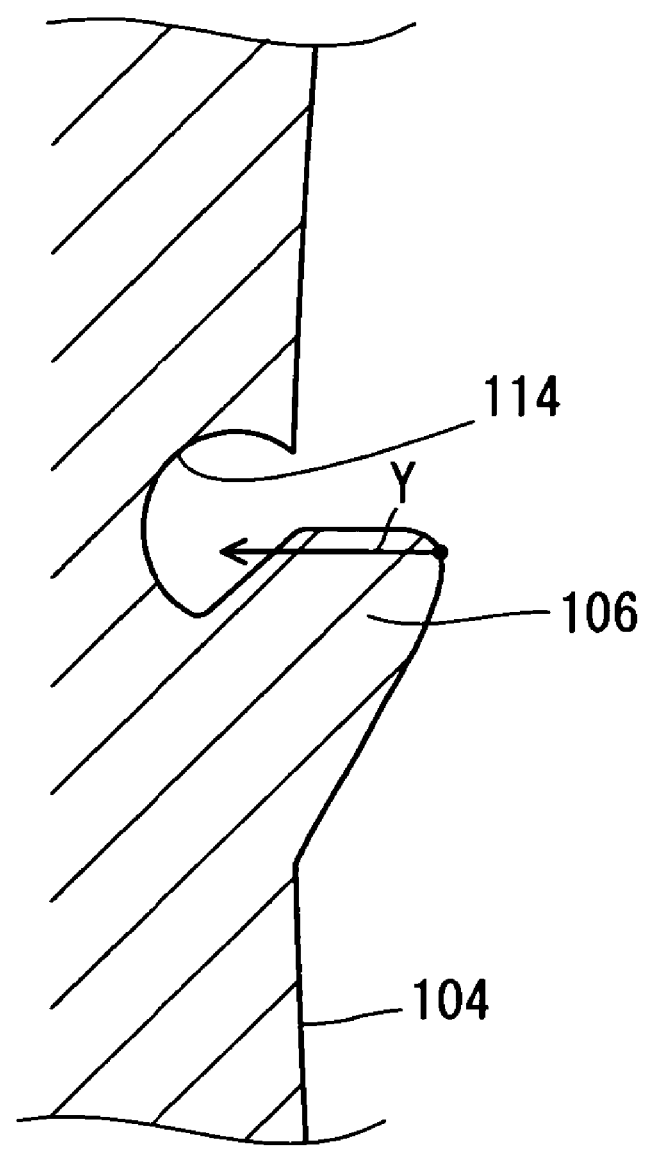
FIG. 14 is a sectional view of the bearing collar taken along lines E-E in FIG. 13.

The ribs 106 have a cross section such as shown in FIG. 14. Near each of the ribs 106, there is formed a groove 114 which has a generally semicircular cross section and extends axially as with the rib 106. When the receptacle 102 is fitted with the magnetostrictive sensor 22, the groove 114 allows the rib 106 to move in a direction so as to increase the diameter (a radially outward direction indicated by Arrow Y).

Figure 15:
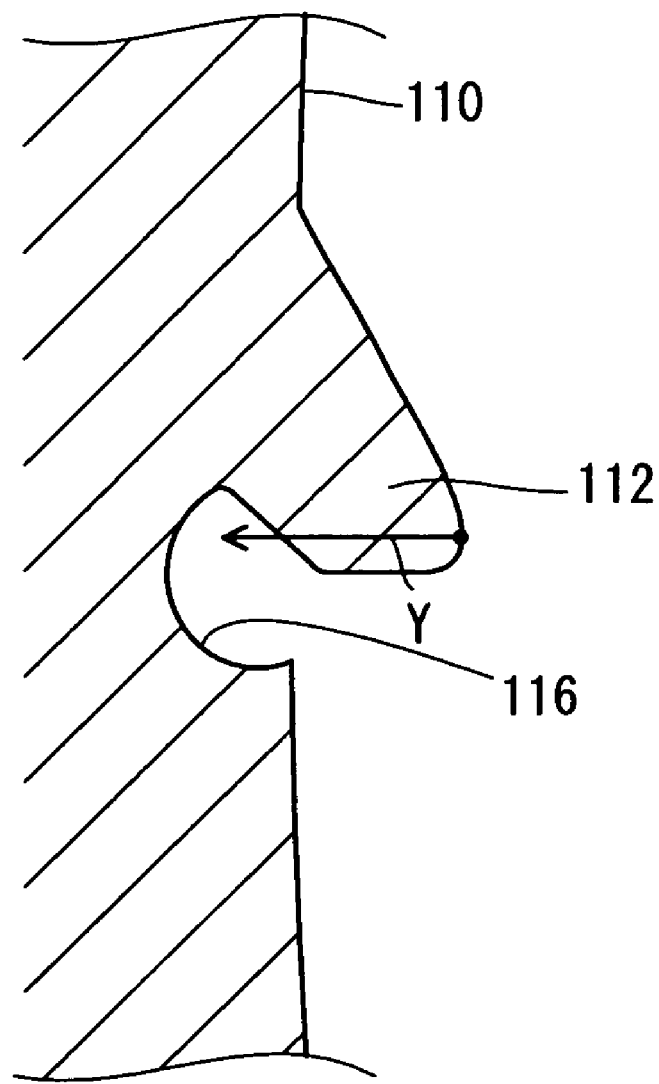
FIG. 15 is a sectional view of the bearing collar taken along lines F-F in FIG. 13.

Likewise, the ribs 112 have a cross section such as that shown in FIG. 15. Near each of the ribs 112, there is formed a groove 116 which has a generally semicircular cross section and extends axially as with the rib 112. When the receptacle 108 is fitted by the pin 58, the groove 116 allows the rib 112 to displace in a direction so as to increase the diameter (a radially outward direction indicated by Arrow Y).

By arranging a plurality of ribs 106, 112 extending axially in the inner side surface of the bearing collar 100 as described above, it becomes possible to hold the magnetostrictive sensor 22 and the pin 58 stably in the bearing collar 100 without play, and to easily reduce axial displacement and tilt of the pin 58 with respect to the magnetic member 30.

Further, by rendering the ribs 106, 112 displaceable in the radially increasing direction, it becomes possible to reduce wear of the rib 112 even if the rib 112 makes contact with the pin 58 when the bearing collar 100 is fitted with the pin 58. Further, even if the bearing collar 100 is fitted with the magnetostrictive sensor 22 and the ribs 106 make contact with the magnetostrictive sensor 22, the impedance of the magnetostrictive sensor 22 is not affected and therefore it is possible to stabilize characteristics of the magnetostrictive sensor 22.

The ribs 106 and 112 are advantageous particularly if the bearing collar 100 is made of resin.

Figure 16:
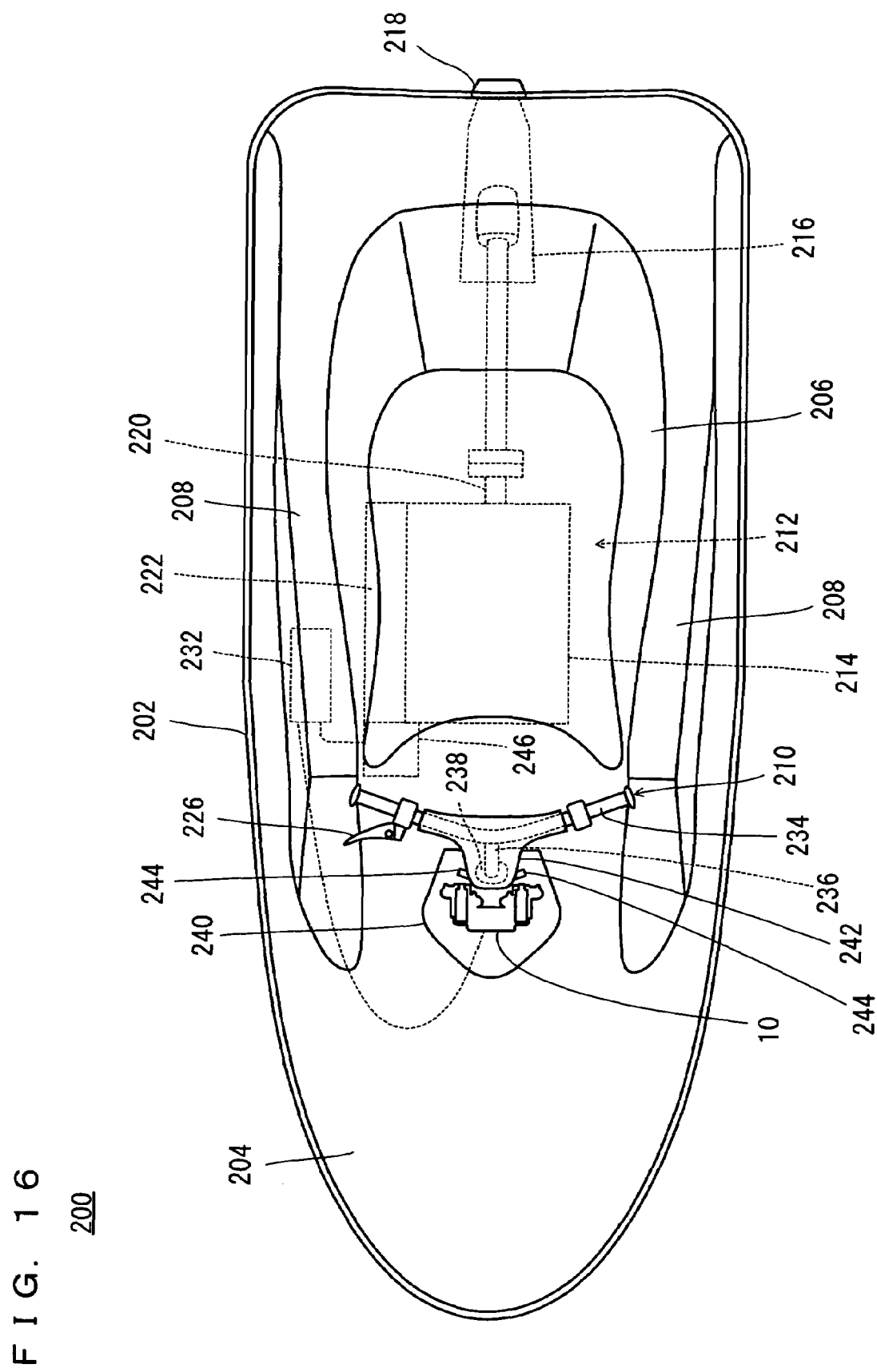
FIG. 16 is a schematic plan view of a water vehicle to which the present invention is applied.

The load detector 10 is suitably applied to a water vehicle as shown in FIG. 16.

Figure 17:
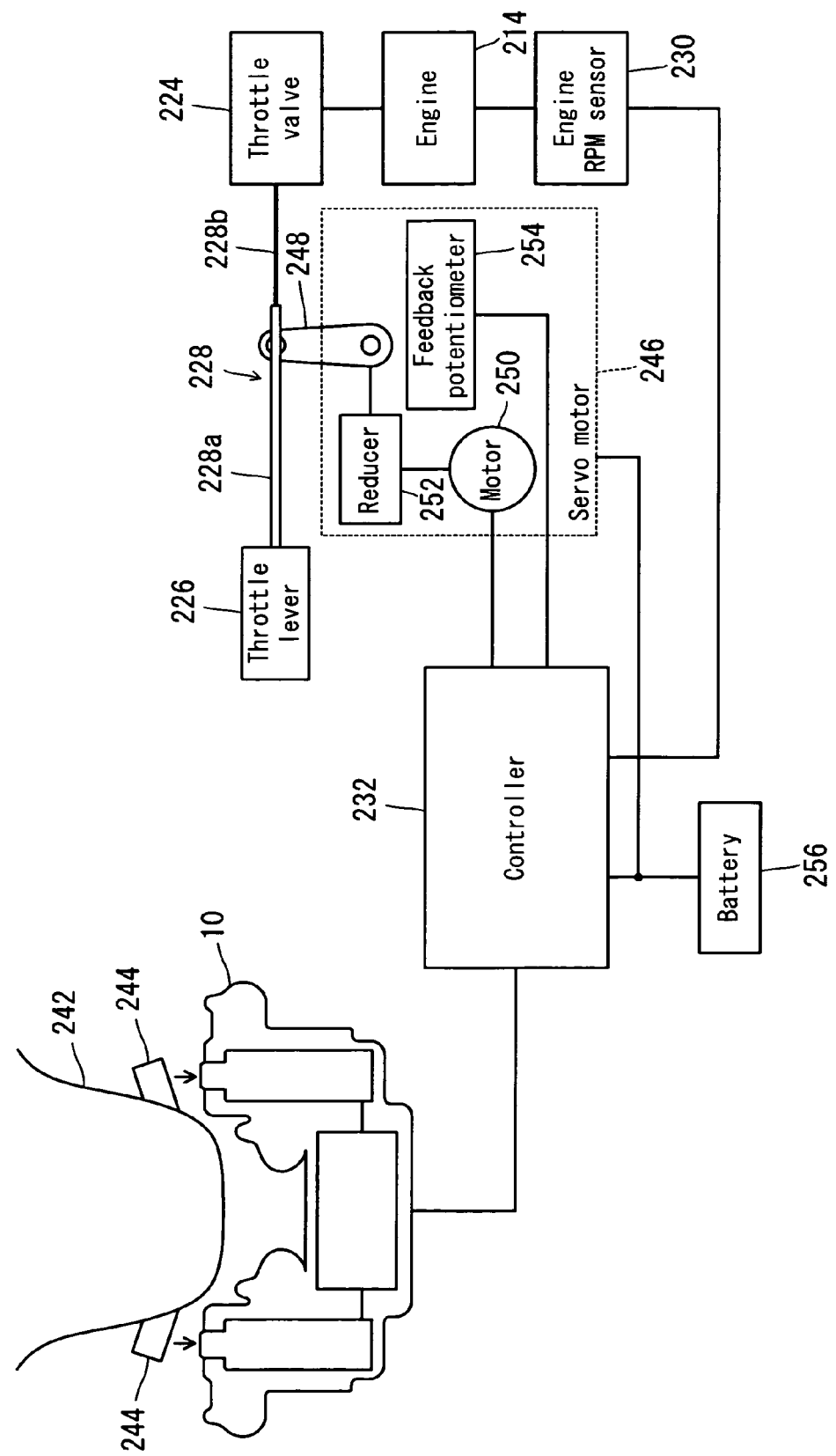
FIG. 17 is a block diagram showing an electrical configuration of the water vehicle in FIG. 16.

Referring to FIG. 16 and FIG. 17, a water vehicle 200 includes a hull 202. An upper portion of the hull 202 is a deck 204, where there is provided a seat 206 for a rider to ride on. On the right and left sides of the seat 206, a pair of steps 208 is provided for the rider to rest his feet. Ahead of the seat 206, there is a steering handle 210 for the rider to grip, and inside the hull 202, a water jet propulsion system 212 is mounted.

As well known, the water jet propulsion system 212 includes an engine 214 and a jet pump 216. Water is pumped by the power of engine 214 from the bottom of the hull 202 and is blasted to the rear from a nozzle deflector 218 located at the rear end of jet pump 216, to provide thrust. The nozzle deflector 218 is supported at the rear end of jet pump 216 pivotably in right and left directions, and is connected with a lower end of the steering handle 210 via an unillustrated push/pull wire and a steering arm.

The engine 214 is a multi-cylinder engine and is connected with a crank shaft 220. The crank shaft 220 is disposed back and forth to the hull 202. An air intake system 222 is mounted on the right-hand side of the hull 202 and connected with the engine. An unillustrated exhaust system is mounted on the left-hand side of the hull 202 and connected with the engine. The air intake system 222 includes a plurality of carburetors corresponding to the number of cylinders in the engine 214. Each carburetor supplies fuel to a corresponding cylinder of the engine. Each carburetor includes a throttle valve 224.

All the throttle valves 224 are interlinked so as to operate together. Of all the throttle valves 224, one which is on the most forward side of the hull is connected with the throttle lever 226 of the steering handle 210, via a throttle wire 228. By operating the throttle lever 226, all of the throttle valves 224 are opened or closed simultaneously. Each throttle valve 224 is urged to close by an unillustrated return spring.

The engine 214 is provided with an engine RPM sensor 230 for detection of the number of revolutions of the crank shaft 220. The engine RPM sensor 230 sends signals for measurement of the number of engine revolutions, to a controller 232.

The steering handle 210 includes a handlebar 234 for the rider to grip on, a steering shaft 236 attached at a central portion of the handlebar 234, a steering shaft bearing 238 which fits around and rotatably supports the steering shaft 236, and a mounting plate 240 for fixing the steering shaft bearing 238 onto the deck 204. The load detector 10 is attached onto the mounting plate 240. The handle cover 242 partially covers the handlebar 234 and the steering shaft 236, rotates together with the handlebar 234, and has two sides, at each of which there is attached an arm 244 for pressing the button 46 of the load detector 10.

At a lower end of the steering shaft 236, a steering push/pull wire is connected via an unillustrated steering arm. By pivoting the handlebar 234 clockwise or counterclockwise, the steering arm is pivoted together in the same direction, directing the nozzle deflector 218 to the right or left via the push/pull wire.

The throttle wire 228 includes an outer tube 228a and an inner wire 228b. The throttle wire 228 is inserted through the steering shaft 236. The outer tube 228a is connected with an arm 248 of a throttle operation servo motor 246, and the inner wire 228b is connected with the throttle valve 224. By pivoting an arm 248 of the servo motor 246, the throttle valves 224 can be opened and closed via the inner wire 228b.

Feedback control is used in the servo motor 246. Rotation of the motor 250 is reduced by a reducer 252 before it is transmitted to the arm 248. In the feedback control, a feedback potentiometer 254 in the arm 248 detects an actual pivoting angle of the arm 248, and the motor 250 is driven until a target angle of the arm 248, which is set by a steering assist system, becomes equal to the actual pivoting angle.

The steering assist system, which improves steering when the water vehicle is moving at a slow speed, includes the load detector 10, the controller 232 connected with the engine RPM sensor 230, the throttle control servo motor 246 controlled by the controller 232, etc., and is powered by a battery 256.

The load detector 10 provides the controller 232 a signal voltage indicating the load, and when the load indicated by the signal voltage is not smaller than a predetermined load, the controller 232 outputs a signal to the servo motor 246 to pivot the arm 248. The predetermined load is set to a load to be detected by the load detector 10 when a handlebar 234 turned to its limit (at a maximum rudder angle) receives a further force in excess of a usual steering force.

According to this steering assist system, the controller 232 provides steering control when the steering handle 210 is turned to its limit and then additional force greater than normal is exerted to the steering handle 210 while the water vehicle 200 is moving at a low speed.

In the steering control by the controller 232, a target angle of the arm 248 of the servo motor 246 is set for a load detected by the load detector 10, and feedback control is performed on the servo motor 246 so that the angle of the arm 248 achieves the target angle. Specifically, according to the steering control, the throttle valve 224 is opened to an opening degree corresponding to the output from the load detector 10 (which is equal to the force exerted to the steering handle 210 by the rider), and the output of the engine 214 is controlled accordingly. Note that when determining the target angle, a rotating direction of the arm 248 for increased opening degree of the throttle valve 224 via the throttle wire 228 represents the positive (i.e. plus) direction.

According to the water vehicle 200 as described above, as shown in FIG. 18, the button 46 of the load detector 10 receives a handling load as the arm 244 rotates and thereby makes contact with the button 46. For this reason, it is difficult to apply the load axially to the button 46 in an exact sense. However, because the load detector 10 can reduce axial displacement and tilt, it is possible to detect the load accurately in the water vehicle 200.

The present invention is applicable further, suitably to other vehicles such as bicycles, for example.

Figure 19:
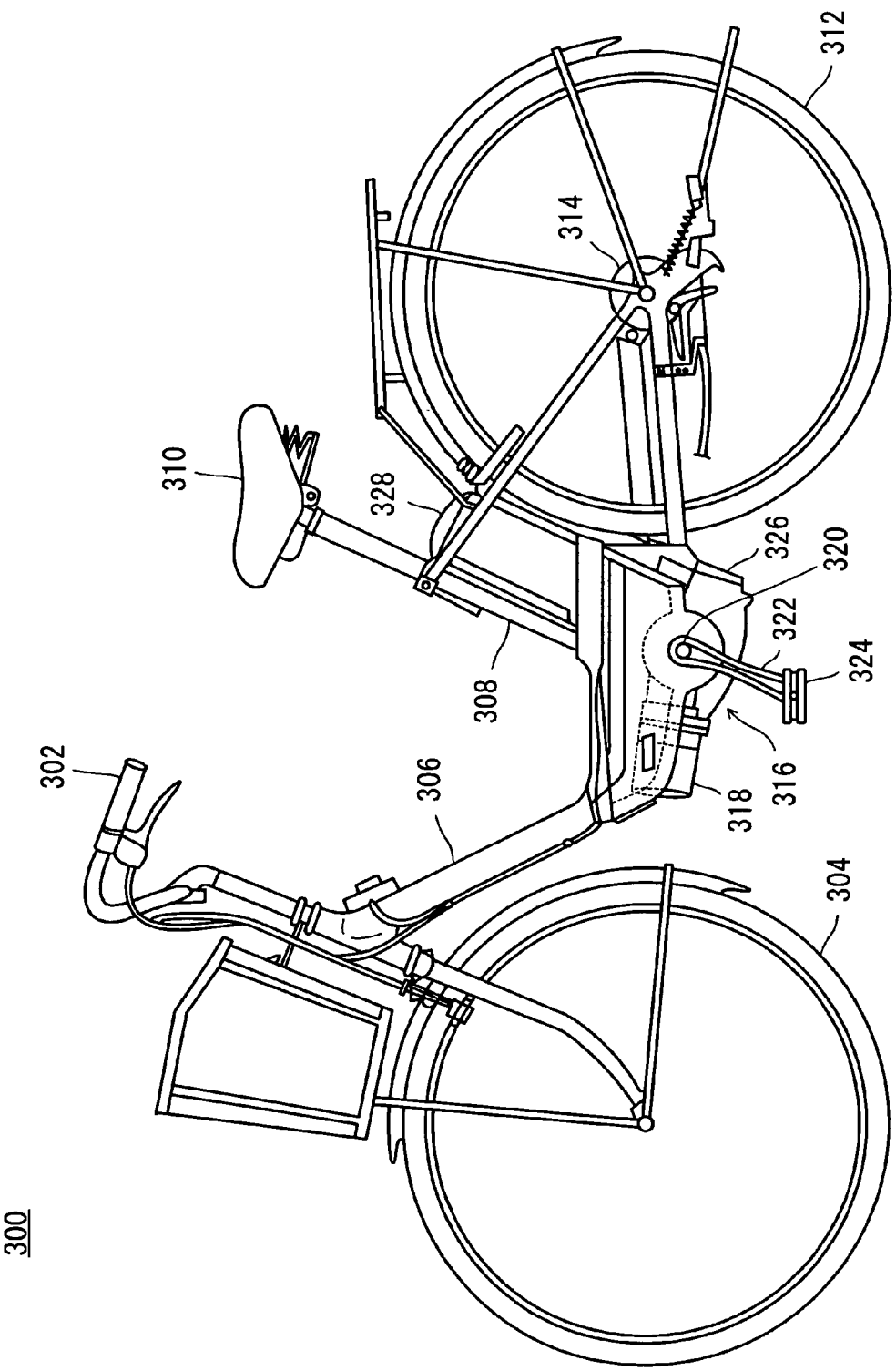
FIG. 19 is a schematic view of an electric bicycle to which the present invention is applied.

Referring to FIG. 19, description will be made for a case in which the load detector according to a preferred embodiment of the present invention is applied to an electric bicycle 300.

The electric bicycle 300 includes a handle 302, a front wheel 304, a down tube 306, a seat tube 308, a seat (saddle) 310, a rear wheel 312 and a wheel sprocket 314. In addition, a power unit 316 is provided at a generally central lower position of the bicycle.

The power unit 316, which has a man-power drive system and a power assist system provided by an electric motor 318, combines a human power (a power supplied by a human) and an assisting power, and outputs the sum of the two. The power unit 316 is provided with a crank shaft 320 that is rotatably mounted. A crank 322 is attached to each end of the crank shaft 320, and a pedal 324 is rotatably supported at an end of each crank 322. The power unit 316 is provided with a controller 326 which controls an output (assisting power) from the electric motor 318 in accordance with the level of force on the pedal 324 inputted to the crank shaft 320.

A battery box 328 is mounted detachably below the seat 310 in a space surrounded by the seat tube 308 and the rear wheel 312. The battery box 328 accommodates an unillustrated Ni—Cd battery composed of a plurality of shrink-packed battery cells.

Figure 20:
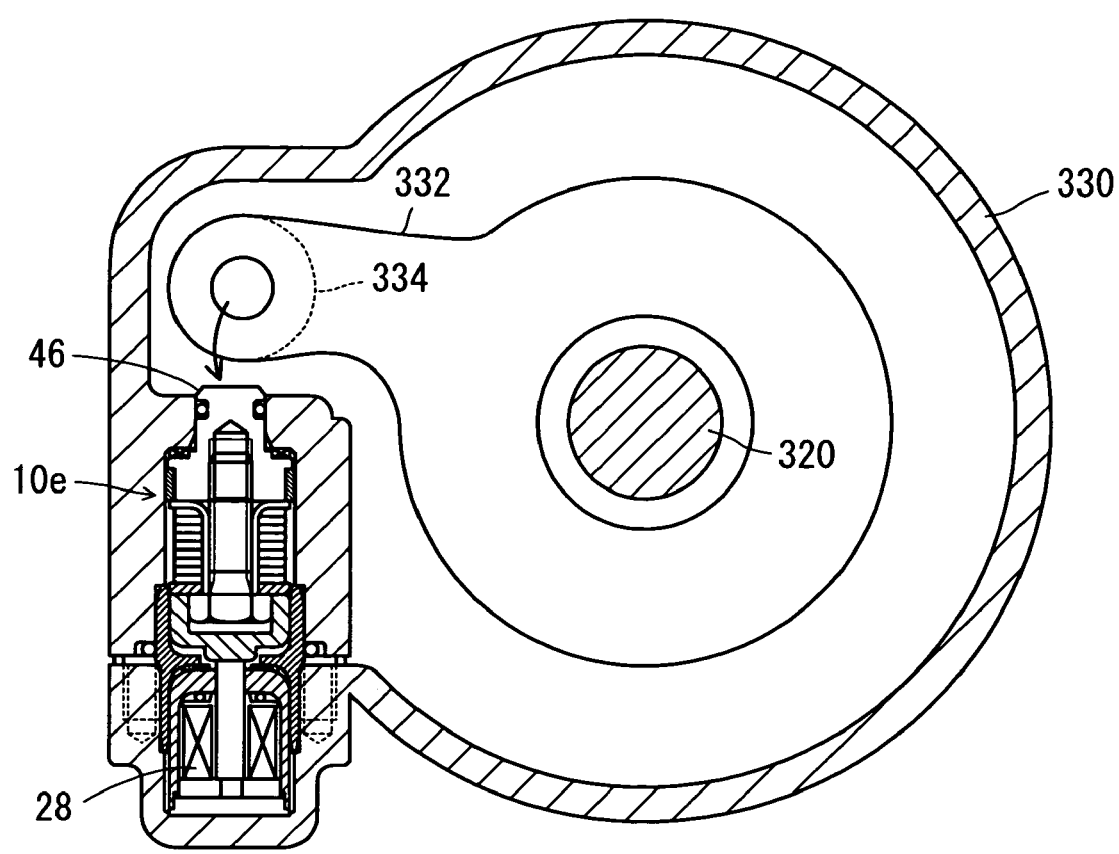
FIG. 20 is a schematic view showing an environment of a load detector applied to the electric bicycle in FIG. 19.

When the rider turns the pedals 324 to drive the crank shaft 320, a torque inputted to the crank shaft 320 is detected by a load detector 10e shown in FIG. 20. The controller 326 controls the output (assisting power) of the electric motor 318 in accordance with the detected torque. Therefore, a resulting force which is a sum of a human power and an assisting power that is proportional thereto is outputted from the power unit 316. The resulting force is transmitted to the wheel sprocket 314 via an unillustrated chain. Thus, the wheel sprocket 314 and the rear wheel 312 are driven to rotate, and the electric bicycle 300 is driven by human power and an assisting power which is proportional thereto.

Referring to FIG. 20, the power unit 316 includes a housing 330. The housing 330 accommodates an arm 332 which is connected with the crank shaft 320, and the load detector 10e. The arm 332 is connected with the roller 334 via an unillustrated ring gear of a planetary gear mechanism. The roller 334 makes contact with a button 46 of the load detector 10e. The load detector 10e is an equivalent to one of the two load detection units 73 of the load detector 10 shown in FIG. 1.

According to the electric bicycle 300 as described above, a reaction force which is proportional to the torque from the crank shaft 320 develops in the ring gear of the planetary gear mechanism. The reaction force acts on the button 46 of the load detector 10e via the roller 334. This compression load generates a voltage change in the coil 28, which is then supplied to the controller 326 as a detection signal. The controller 326 calculates the amount of torque based on the inputted detection signal, and controls the output (assisting power) from the electric motor 318 in accordance with the torque.

According to the electric bicycle 300 as described above, a load is exerted to the button 46 of the load detector 10e via a rotating motion of the arm 332, and for this reason, it is difficult to apply the load axially to the button 46 in an exact sense. However, by using the load detector 10e, it becomes possible to apply the load axially, and to detect the torque accurately.

Obviously, any of the load detectors 10a through 10d is applicable to the water vehicle 200, and any of the load detection units 73a through 73d is applicable to the electric bicycle 300.

The present invention is applicable to any transport equipment other than the water vehicle and the electric bicycle.

The present invention being thus far described and illustrated in detail, it is obvious that these description and drawings only represent examples of preferred embodiments of the present invention, and should not be interpreted as limiting the invention. The spirit and scope of the present invention is only limited by words used in the accompanied claims.

What is claimed is:

1. A load detector comprising:
a magnetostrictive sensor including a hollow case;
a coil housed in the case; and
a rod-like magnetic member located along an approximate axial center of the coil, magnetized by an electric current flowing through the coil and receiving a load at an end thereof;
a pin having a contact surface arranged to apply the load onto the end of the magnetic member and axially aligned with the magnetic member; and
a displacement reduction member arranged adjacent to the pin to reduce displacement of the pin in directions not coaxial to both the magnetic member and the coil.

2. A load detector comprising:
a magnetostrictive sensor including a hollow case;
a coil housed in the case; and
a rod-like magnetic member located along an approximate axial center of the coil, magnetized by an electric current flowing through the coil and receiving a load at an end thereof;
a pin having a contact surface arranged to apply the load onto the end of the magnetic member and axially aligned with the magnetic member; and
a displacement reduction member arranged to reduce displacement of the pin with respect to the magnetic member; wherein
the displacement reduction member includes a tubular member into which the magnetostrictive sensor and the pin are fitted so as to face each other.

3. The load detector according to claim 2, wherein the tubular member has at least one rib extending axially in at least one of an inner side surface on the magnetostrictive sensor side and an inner side surface on the pin side.

4. The load detector according to claim 3, wherein the at least one rib is displaceable in a radially increasing direction when the tubular member is fitted by the magnetostrictive sensor or the pin.

5. A load detector comprising:
a magnetostrictive sensor including a hollow case;
a coil housed in the case; and
a rod-like magnetic member located along an approximate axial center of the coil, magnetized by an electric current flowing through the coil and receiving a load at an end thereof;
a pin having a contact surface arranged to apply the load onto the end of the magnetic member and axially aligned with the magnetic member; and
a displacement reduction member arranged to reduce displacement of the pin with respect to the magnetic member; wherein
the displacement reduction member includes a collar extending axially of the pin on a side that is spaced away from the contact surface of the pin, and a fixing element arranged to fix the pin with the collar.

6. A load detector comprising:
a magnetostrictive sensor including a hollow case;
a coil housed in the case; and
a rod-like magnetic member located along an approximate axial center of the coil, magnetized by an electric current flowing through the coil and receiving a load at an end thereof;
a pin having a contact surface arranged to apply the load onto the end of the magnetic member and axially aligned with the magnetic member; and
a displacement reduction member arranged to reduce displacement of the pin with respect to the magnetic member; wherein
the displacement reduction member is a tubular extension of the case extended axially on a side of the pin and arranged to be fitted by the pin.

7. A load detector comprising:
a magnetostrictive sensor including a hollow case;
a coil housed in the case; and
a rod-like magnetic member located along an approximate axial center of the coil, magnetized by an electric current flowing through the coil and receiving a load at an end thereof;
a pin having a contact surface arranged to apply the load onto the end of the magnetic member and axially aligned with the magnetic member; and
a displacement reduction member arranged to reduce displacement of the pin with respect to the magnetic member; wherein
the displacement reduction member includes a conical recess provided in a contact surface of the magnetic member which makes contact with the pin, and a hemispherical projection arranged to fit into the recess and provided in the contact surface of the pin which makes contact with the magnetic member.

8. A load detector comprising:
a magnetostrictive sensor including a hollow case;
a coil housed in the case; and
a rod-like magnetic member located along an approximate axial center of the coil, magnetized by an electric current flowing through the coil and receiving a load at an end thereof;
a pin having a contact surface arranged to apply the load onto the end of the magnetic member and axially aligned with the magnetic member; and
a displacement reduction member arranged to reduce displacement of the pin with respect to the magnetic member; wherein
the displacement reduction member includes a flat contact surface of the magnetic member which makes contact with the pin and a spherical contact surface of the pin which makes contact with the magnetic member.

9. The load detector according to claim 1, further comprising a plurality of load detection units each including the magnetostrictive sensor, the pin and the displacement reduction member.

10. Transport equipment comprising the load detector according to claim 1.

11. A water vehicle comprising the load detector according to claim 1.

12. A bicycle comprising the load detector according to claim 1.

13. A vehicle comprising:
a power assist system; and
a load detector operatively connected to the power assist system, the load detector including:
a magnetostrictive sensor including a hollow case;
a coil housed in the case; and
a rod-like magnetic member located along an approximate axial center of the coil, magnetized by an electric current flowing through the coil and receiving a load at an end thereof;
a pin having a contact surface arranged to apply the load onto the end of the magnetic member and axially aligned with the magnetic member; and
a displacement reduction member arranged adjacent to the pin to reduce displacement of the pin in directions not coaxial to both the magnetic member and the coil.

14. The vehicle according to claim 13, wherein the power assist system is a steering assist system.

15. The vehicle according to claim 13, wherein the power assist system is a vehicle propulsion system.

16. The vehicle according to claim 13, wherein the vehicle is a water vehicle.

17. The vehicle according to claim 13, wherein the vehicle is an electric bicycle.

* * * * *